United States Patent
Tzannes et al.

(10) Patent No.: US 8,175,140 B2
(45) Date of Patent: *May 8, 2012

(54) SYSTEMS AND METHODS FOR A MULTICARRIER TRANSCEIVER WITH RADIO FREQUENCY INTERFERENCE REDUCTION

(75) Inventors: Marcos C. Tzannes, Orinda, CA (US); Fernando Ramirez-Mireles, Walnut Creek, CA (US)

(73) Assignee: Lantiq Deutschland GmbH, Neubiberg (DE)

( * ) Notice: Subject to any disclaimer, the term of this patent is extended or adjusted under 35 U.S.C. 154(b) by 340 days.

This patent is subject to a terminal disclaimer.

(21) Appl. No.: 12/355,360

(22) Filed: Jan. 16, 2009

(65) Prior Publication Data

US 2009/0122977 A1    May 14, 2009

Related U.S. Application Data

(60) Continuation of application No. 11/427,027, filed on Jun. 28, 2006, now abandoned, which is a continuation of application No. 11/312,697, filed on Dec. 21, 2005, now abandoned, which is a continuation of application No. 10/654,009, filed on Sep. 4, 2003, now abandoned, which is a division of application No. 10/358,246, filed on Feb. 5, 2003, now abandoned, which is a division of application No. 09/876,073, filed on Jun. 8, 2001, now Pat. No. 6,556,623.

(60) Provisional application No. 60/210,556, filed on Jun. 9, 2000.

(51) Int. Cl.
 *H04B 17/00* (2006.01)

(52) U.S. Cl. ...................................................... 375/224

(58) Field of Classification Search .................. 375/224, 375/346, 260, 285, 321, 348, 360; 370/210; 329/318

See application file for complete search history.

(56) References Cited

U.S. PATENT DOCUMENTS

| 5,726,978 A | 3/1998 | Frodigh et al. |
| 5,737,359 A | 4/1998 | Koivu |
| 6,014,412 A | 1/2000 | Wiese et al. |
| 6,035,000 A | 3/2000 | Bingham |
| 6,160,820 A | 12/2000 | Isaksson et al. |
| 6,556,623 B2 | 4/2003 | Tzannes et al. |

(Continued)

FOREIGN PATENT DOCUMENTS

JP       002920131 B2    6/1999

(Continued)

OTHER PUBLICATIONS

Fisher R F H et al: "A New loading algorithm for discrete multitone transmission" Global Telecommunications Conference, 1996, Globecom '96. 'Communications: The Key to Global Property London ISBN 978-0-7803-336-9.

(Continued)

*Primary Examiner* — Kevin Kim
(74) *Attorney, Agent, or Firm* — SpryIP, LLC

(57) ABSTRACT

A multi-carrier information transceiver that exhibits robustness against radio frequency interference (RFI) signals present in the communications channel. The transceiver includes a RFI mitigation technique that operates not only during the steady state operation of the transceiver but also during the training stage of the transceiver. That requires dynamically modifying the training signals when the presence of RFI is detected. The modification of the training signals facilitates the estimation of RFI, improving the performance of the multi-carrier transceiver.

11 Claims, 10 Drawing Sheets

U.S. PATENT DOCUMENTS

| | | | |
|---|---|---|---|
| 6,577,598 | B1 | 6/2003 | Hwang et al. |
| 6,714,520 | B1 | 3/2004 | Okamura |
| 6,829,307 | B1 * | 12/2004 | Hoo et al. .................. 375/260 |
| 6,985,548 | B1 | 1/2006 | Jabbar et al. |
| 7,039,120 | B1 | 5/2006 | Thoumy et al. |
| 2003/0118088 | A1 | 6/2003 | Tzannes et al. |
| 2004/0057508 | A1 | 3/2004 | Tzannes et al. |
| 2006/0098724 | A1 | 5/2006 | Tzannes et al. |
| 2006/0233227 | A1 | 10/2006 | Tzannes et al. |

FOREIGN PATENT DOCUMENTS

| | | |
|---|---|---|
| JP | 2920131 | 7/1999 |
| JP | 2000-031936 | 1/2000 |
| WO | WO-99/26365 | 5/1999 |

OTHER PUBLICATIONS

EP Search Report, EP Application No. 10156857.4; date of mailing May 26, 2010.

Official Action for Canadian Patent Application No. 2,411,364, mailed Aug. 21, 2009.

Intention to Grant a European Patent for European Patent Application No. EP 07000779, completed Oct. 14, 2009.

Bingham, J. et al., "Digital RFI Cancelation with SDMT", ANSI contribution T1E1.4/96-083, (Amati), Colorado Springs, CO, Apr. 22, 1996.

Cioffi, J. M. et al., "Analog RF Cancelation with SDMT", ANSI contribution T1E1.4/96-084, (Amati), Colorado Springs, CO, Apr. 18, 1996.

Clercq, L. de et al., "Mitigation of Radio Interference in xDSL Transmission", IEEE Communications Magazine, vol. 38, No. 3, Mar. 2000, pp. 168-172.

Nortel Networks, "G.test.bis: Laboratory Set-ups and procedures to include RFI impairments in the testing of DSL transceivers", ITU contribution NT-036, Nashville, Tennessee, Nov. 1-5, 1999.

Sandberg, S. et al., "Overlapped Discrete Multitone Modulation for High Speed Copper Wire Communications", IEEE JSAC, vol. 13, No. 9, Dec. 1995, pp. 1571-1585.

Spruyt, P. et al., "Performance of Improved DMT Transceiver for VDSL", ANSI contribution T1E1.4/96-104, (Alcatel), Colorado Springs, CO, Apr. 22-25, 1996.

PCT International Search Report; International Application No. PCT/US01/40887; date of mailing Feb. 27, 2002.

Written Opinion for International (PCT) Patent Application No. PCT/US01/40887, mailed Apr. 15, 2002.

International Preliminary Examination Report for International (PCT) Patent Application No. PCT/US01/40887, mailed Jun. 12, 2002.

Examiner's First Report for Australian Patent Application No. 2005/200543, mailed Apr. 28, 2006.

Official Action for Australian Patent Application No. 2008-200295, mailed Oct. 31, 2008.

Official Action for Canadian Patent Application No. 2,411,364, mailed Mar. 11, 2008.

Official Action and Summons to Attend Oral Proceedings for European Patent Application No. 01944664.0-2415, dated Feb. 8, 2006.

Official Action for European Patent Application No. 01944664.0-2415, dated Nov. 29, 2004.

European Search Report for European Patent Application No. EP 07000779, completed Mar. 16, 2007.

Notification of Reason for Refusal for Japanese Patent Application No. 2002-502995, dispatched Jul. 22, 2008.

Notification of Reason for Refusal for Japanese Patent Application No. 2002-502995, dispatched Nov. 25, 2008.

Preliminary Rejection (including translation) for Korean Patent Application No. 10-2002-7016764, issued Jul. 30, 2007.

* cited by examiner

SYSTEMS AND METHODS FOR A MULTICARRIER TRANSCEIVER WITH RADIO FREQUENCY INTERFERENCE REDUCTION

RELATED APPLICATION DATA

This application claims the benefit of U.S. Provisional Application Ser. No. 60/210,556 entitled "Methods to Improve the Performance of DSL in the Presence of RFI" filed Jun. 9, 2000 and incorporated herein by reference in its entirety.

BACKGROUND OF THE INVENTION

1. Field of the Invention

This invention relates to information transceivers. In particular, this invention relates to multi-carrier information transceivers with radio frequency interference reduction.

2. Description of Related Art

Multi-carrier communications transceivers allow the high-speed transmission of information using the twisted-pair telephone lines that connect individual subscribers to a telephone central office. Each pair of copper wires provides a communication channel in which the frequency response attenuates as the frequency increases. The wires also contain noises of a different nature produced by a variety of sources. Among these noises are thermal noises produced by electric devices and cross-talk noises produced by, for example, other subscribers connected to the same central office and sharing the same bundle of twisted-pairs.

The twisting of the twisted-pairs help to reduce the cross-talk noise by limiting electromagnetic coupling between the pair of lines that are close together. However, as the frequency of operation increases, the effect of twisting is limited and the cross-talk noise increases proportional to frequency.

In order to provide reliable communications over a channel with limited bandwidth and frequency-dependent noise, multi-carrier transceivers apply a "divide and conquer" strategy. In this strategy, the total bandwidth of the communication channel is divided into a number of frequency sub-bands. Each sub-band is a sub-channel in which an information signal is transmitted. The width of the frequency sub-bands is chosen to be small enough to allow the distortion introduced by a sub-channel to be modeled by a simple complex value representing the attenuation and phase shift of the received signal. Various information signals are transmitted simultaneously using the various sub-channels. The receiver is able to separate the information signals in the different frequency sub-bands by using a bank of band-pass filters each one tuned to one of the different sub-bands. If these filters are chosen properly, the noise in each frequency band can be modeled using only the noise level present in that sub-band, with the noise in one band having little to no effect in the adjacent sub-bands.

A primary advantage of a multi-carrier transceiver is that the transceiver parameters can be optimized for different channel conditions in order to obtain maximum performance. The optimization process can be summarized as follow: First, a desired bit error rate is established. Second, the signal-to-noise ratio available in every sub-channel is measured. The bit error rate and the signal-to-noise ratio are then used to determine the maximum bit transmission rate that the sub-channel can support. Finally, an optimal set of information signals capable of transmitting this maximum bit transmission rate is found. By optimizing each sub-band, the total transmission capacity of the multi-carrier transceiver for a given error rate is maximized.

Usually, the noise in the telephone lines also contains radio frequency interference (RFI) produced by, for example, electromagnetic coupling of radio frequency signals coming from radio broadcasting transceivers that operate in the same radio frequency band as the multi-carrier transceiver. When present, this RFI can degrade the performance of the multi-carrier transceiver significantly, making the multi-carrier transceiver operate well below its optimum performance. The nature of the RFI is different from the difficulties associated with thermal noise and crosstalk noise. Optimizing a transceiver to operate in the presence of all the noises results in transceivers with great complexity, such as the transceiver disclosed by Sandberg et al. in 1995 entitled "Overlapped Discrete Multitone Modulation for High Speed Copper Wire Communications." In practice, RFI mitigation techniques that minimize the degradation in performance are preferred.

SUMMARY OF THE INVENTION

For ease of illustration the following terminology will be used to discuss the operation of an exemplary multi-carrier transceiver. Specifically, an idle channel is a communications channel that may contain noise, crosstalk and RF signals in any portion of the spectrum, but does not contain upstream or downstream multi-carrier signals. The carriers in the multi-carrier transceiver will be denoted as tones. A tone is disabled when there is no energy transmission in that particular tone. A training or initialization signal, which is typically sent during the training state, is a multi-carrier transceiver initialization training signal used to train the transceiver before commencing the transmission of information. For the multi-carrier transceiver known as ADSL, these training signals are defined in the INITIALIZATION section of ITU standards G.992.1 (G.dmt), G.992.2 (G.lite) and the G.994.1 (G.hs), incorporated herein by reference in their entirety.

Steady state signals or information signals are the signals sent by the multi-carrier transceiver when communicating information data bits. The steady state transmission typically follows the training state transmission. For the multi-carrier transceivers known as ADSL, the steady state signals are defined in the SHOWTIME sections of ITU standards G.992.1 (G.dmt) and the G.992.2 (G.lite), incorporated herein by reference in their entirety.

An RFI band is a group of one or more tones in which a single RFI is identified. In general, the location of these bands within the total bandwidth of transmission is not known until the operation of the multi-carrier transceiver starts; and the tones in an RFI band may or may not be disabled during the transceiver operation. However, there are certain restricted RFI bands where the presence of RFI is highly probable. The location of these restricted RFI bands can be specified in advance before the operation of the multi-carrier transceiver starts, and, for example, the tones in a restricted RFI band permanently disabled during the operation of the transceiver.

RFI can, for example, be one of the many performance limiting factors when a multi-carrier transceiver is deployed in the field. For the multi-carrier transceiver known as ADSL, tests that include measuring the performance of ADSL in the presence of RFI are now being defined in "G.test.bis: Laboratory Set-ups and procedures to include RFI impairments in the testing of DSL transceivers" by Nortel Networks®, incorporated herein by reference in its entirety. These tests, as well as other industry-standard tests, provide a good reference model in which the performance RFI mitigation techniques can be measured.

An exemplary embodiment of the present invention describes a multi-carrier information transceiver with robustness against radio frequency interference (RFI) signals present in a communications channel. The multi-carrier transceiver comprises a radio frequency interference mitigation technique that operates, for example, not only during the steady state operation of the transceiver but also during the training state of the transceiver.

The transceiver is able to dynamically modify the training signals when the presence of RFI is detected. For example, the training signals can be modified by dynamically disabling tones in the region of the spectrum where the RFI is detected. For example, this detection can occur during an initialization phase. In this exemplary embodiment, the receiver sends a message instructing the transmitter to disable tones in the multi-carrier signals during certain phases of training and or steady state operation. The message contains, for example, a field that designates which of the tone number(s) are to be disabled and during which stages of training and/or steady state operation they are to be disabled. The transmitter can also receive this message and, for example, disable the specified tones during the specified stages of training and or steady state, for example, during a signal-to-noise ratio measurement and related calculations, during a training of the equalizer, or in other types of training or measurement. During the remaining stages of training and/or steady state, where instructions are not necessarily specified in the message, the transmitter does not disable the specified tones, but could send the standard signals in those tones.

According, an in accordance with an exemplary embodiment of this invention, a first aspect of the invention relates to providing an improved multi-carrier transceiver.

Aspects of the invention also relate to providing a multi-carrier information transceiver in which, for example, prior to the training phase, the presence or absence of RFI in the communications channel can be established. If, for example, RFI is detected, the receiver can instruct the transmitter to disable tones in one or more of the training signals, and during different stages of the modem training phase. The receiver can also instruct the transmitter to disable tones in the information signals during the steady state phase. If no RFI is detected, then, for example, the transmission of both training and steady state signals can occur without disabling any tones.

Aspects of the invention also relate to providing a multi-carrier information transceiver in which a RFI mitigation technique takes advantage of the disabled tones in both the training signals and the steady state signals to better estimate the RFI.

These and other features and advantages of this invention are described in, or are apparent from, the following detailed description of the embodiments.

DETAILED DESCRIPTION OF THE INVENTION

Figure 1:
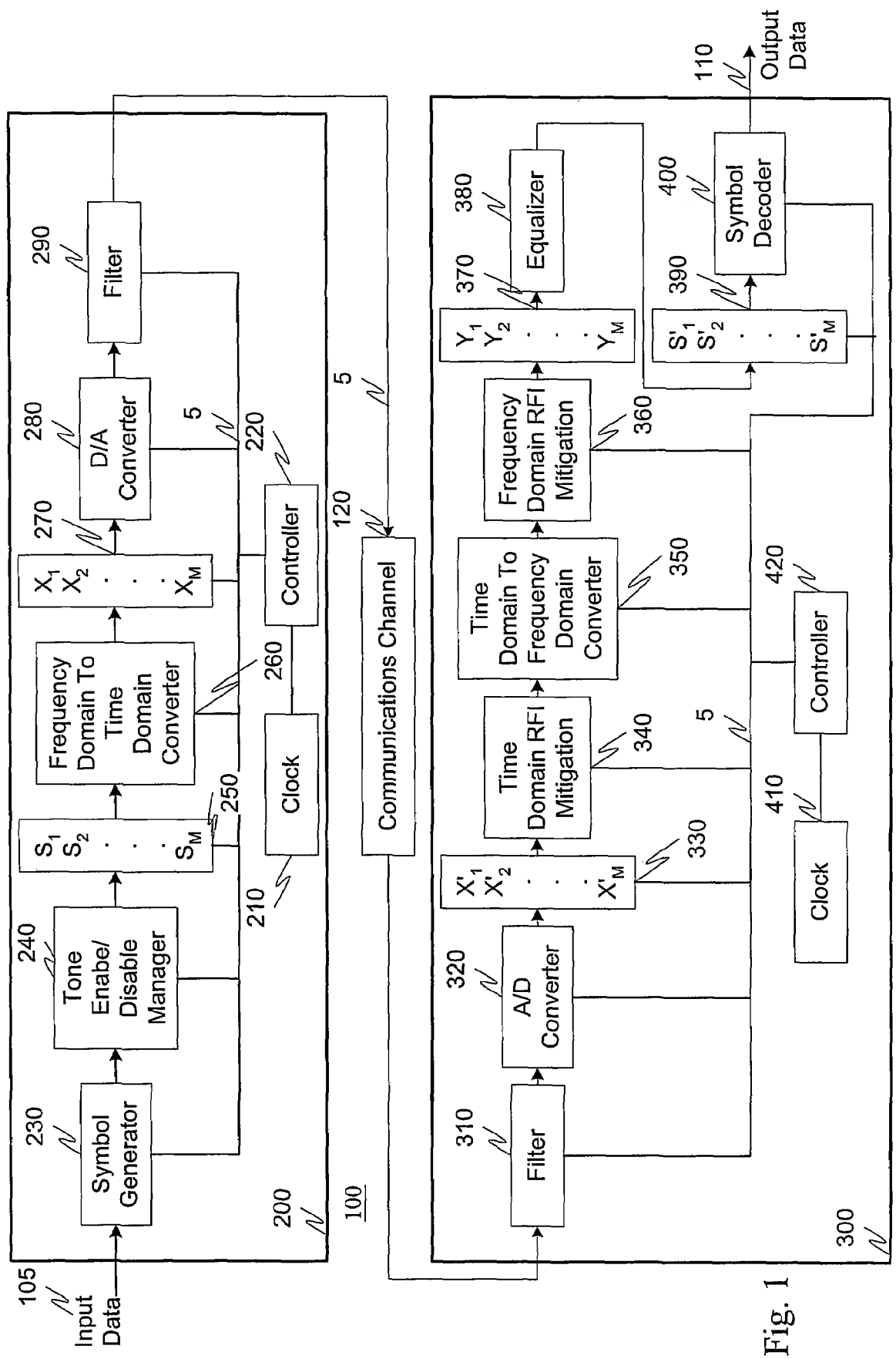
FIG. 1 is a block diagram illustrating an exemplary multi-carrier transceiver according to this invention.

FIG. 1 illustrates an exemplary multi-carrier transceiver 100. Specifically, the transmitter section of one transceiver and the receiving section of a second transceiver are shown in FIG. 1. The multi-carrier transceiver 100 comprises a transmitter section 200 and a receiver section 300 interconnected by communications channel 120 and links 5. The transmitter 200 comprises a clock 210, a controller 220, a symbol generator 230, a tone manager 240, a memory 250, a frequency domain to time domain converter 260, a memory 270, a digital to analog converter 280 and a filter 290 interconnected by link 5. The receiver 300 comprises a filter 310, an analog to digital converter 320, a memory 330, a time domain RFI mitigation module 340, a time domain to frequency domain converter 350, a frequency domain RFI mitigation module 360, a memory 370, an equalizer 380, a memory 390, a symbol decoder 400, a clock 410 and a controller 420 interconnected by link 5.

While the exemplary embodiment illustrated in FIG. 1 shows the transceiver 100 and associated components collocated, it is to be appreciated that the various components of the transceiver 100 can be located at distant portions of a communications network. Thus, it should be appreciated that the components of the transceiver 100 can be combined into one device or separated into a plurality of devices. Furthermore, it should be appreciated that for ease of illustration, the various functional components of the transceiver 100 have been divided as illustrated in FIG. 1. However, any of the functional components illustrated in FIG. 1 can be combined or further partitioned without affecting the operation of the system. As will be appreciated from the following description, and for reasons of computation efficiency, the components of the document can be arranged at any location within a communications network without effecting the operation of the system. Furthermore, it is to be appreciated that the term module as used herein includes any hardware and/or software that provide the functionality as discussed herein. Furthermore, the links 5 can be a wired or wireless link or any other known or later developed element(s) that is capable of supplying and communicating data to and from the connected elements.

In operation, the transmitter 200 codes input data 105 for transmission on a communication link 120. The receiver 300 decodes the data received from the transmitter 200 and outputs the decoded data as output data 110. In particular, the symbol generator 230 receives a portion of the input data 105, such as a stream of data. The tone manager 240 determines, with the aid of controller 220, which tones are enabled or disabled based on, for example, channel conditions, noise, interference, or the like. The number of different values a symbol can take will depend on, for example, the characteristics of the communications channel 120, the desired robustness of information transmission, or the like. More specifically, the number of different values a symbol can take depends on the signal-to-noise ratio available in a particular sub-channel and the desired bit error probability. When the controller 220 determines that N bits have been received by symbol generator 230, the controller 220 instructs the symbol generator 230 to convert the run of received data bits into M symbols $S_1, S_2, \ldots, S_M$ which are stored in the memory, such as a register 250. The symbols in the register 250 are assigned to tones in the multi-carrier transceiver. However, if a tone is disabled, the tone manager 240 does not assign a symbol.

For ease of illustration, the transceiver 100 treats the symbols $S_i$ as if they were the amplitude of a signal in a narrow frequency band. It is assumed that the phase deviation of each signal is zero when the signal enters the communication link 120. Thus, the frequency domain to time domain converter 260 determines, with the aid of controller 220 and clock 210, a time-domain signal denominated multi-carrier symbol having values $X_i$. The $X_i$ signal has its frequency components weighted by the individual symbols $S_i$ over the time period represented by the M samples $X_i$. The $X_i$ signal values are then stored in the memory 270. The contents of the memory 270 represent, in digital form, the next segment of the signal that is to be actually transmitted over the communication link 120. For the multi-carrier transceiver known as ADSL, a segment of the final portion of $X_i$, denominated a cyclic prefix (CP), is prefixed to the multi-carrier symbol $X_i$ itself, prior to the D/A conversion. The actual transmission of the digital signal is accomplished by clocking the digital values onto communication link 120 after converting the values to analog voltages using the D/A converter 280. The clock 210 provides the timing pulses for the operation. The output of the D/A converter 280 is low-pass filtered by the filter 290 before being placed on the communications link 120.

The communications link 120 will, in general, both attenuate and phase shift the signal represented by the $X_i$. The communications link 120 will also add noises, such as, thermal noise, crosstalk and RFI to the signal output by the transmitter 200. At the receiving end of communications link 120, an attempt to recover each $S_i$ is made by essentially reversing the modulation process done by the transmitter 200 and correcting for losses in the communications link 120.

Upon receipt of the signal at the receiver 300 from the transmitter 200, the via the communications link 120, the filter 310 low-pass filters the signal to reduce the effects of out-of-band noise. Then, with the cooperation of the controller 420, the signals are digitized by A/D converter 320 and shifted, as $X'_i$, into the memory 330, such as a register. This is preferably accomplished with the aid of the clock 410, which can be synchronized to the clock 210. When M values have been shifted into the register 330, the contents thereof are processed by the time-domain RFI mitigation module 340, which multiplies the received signal composed of CP and $X'_i$ by a window in order to reduce the sidelobes of the RFI. The output of time-domain RFI mitigation module 340 is converted, via a time-domain to frequency-domain converter 350 into a set of frequency-domain samples. This transformation is the inverse of the transformation generated by frequency-domain to time-domain converter 260. The frequency-domain samples at the output of the converter 350 are processed by the frequency-domain RFI mitigation module 360 to generate a set of frequency domain symbols $Y_i$, in which the RFI component has been mitigated. Then, the equalizer 380 updates each $Y_i$ for attenuation and phase shifts that may have resulted from the communication over the communications link 120 to recover a noisy version $S'_i$ of the original symbols. These symbols are then stored in the memory, such as a buffer, 390. Finally, the contents of the memory 390 are decoded by the symbol decoder 400 and output as the output data stream 110.

The RFI mitigation modules 340 and 360 attenuate the effects of the RFI in the communications channel 120, while the tone manager 240 facilitates the operation of the frequency-domain RFI mitigation module 360. The exemplary embodiments of the tone manager 240, the time-domain RFI mitigation module 340 and the frequency-domain RFI mitigation module are discussed below with references to FIGS. 2-10. However, those skilled in the art will readily appreciate that the description given with respect to these exemplary figures is for illustrative purposes only.

For the purpose of this discussion, in relation to the frequency-domain RFI mitigation module 360 and the tone manager 240, the frequency-domain signal values will be represented by bins in the Fast Fourier Transform (FFT). Each bin is a complex number representing the amplitude and phase of a tone.

Figure 2:
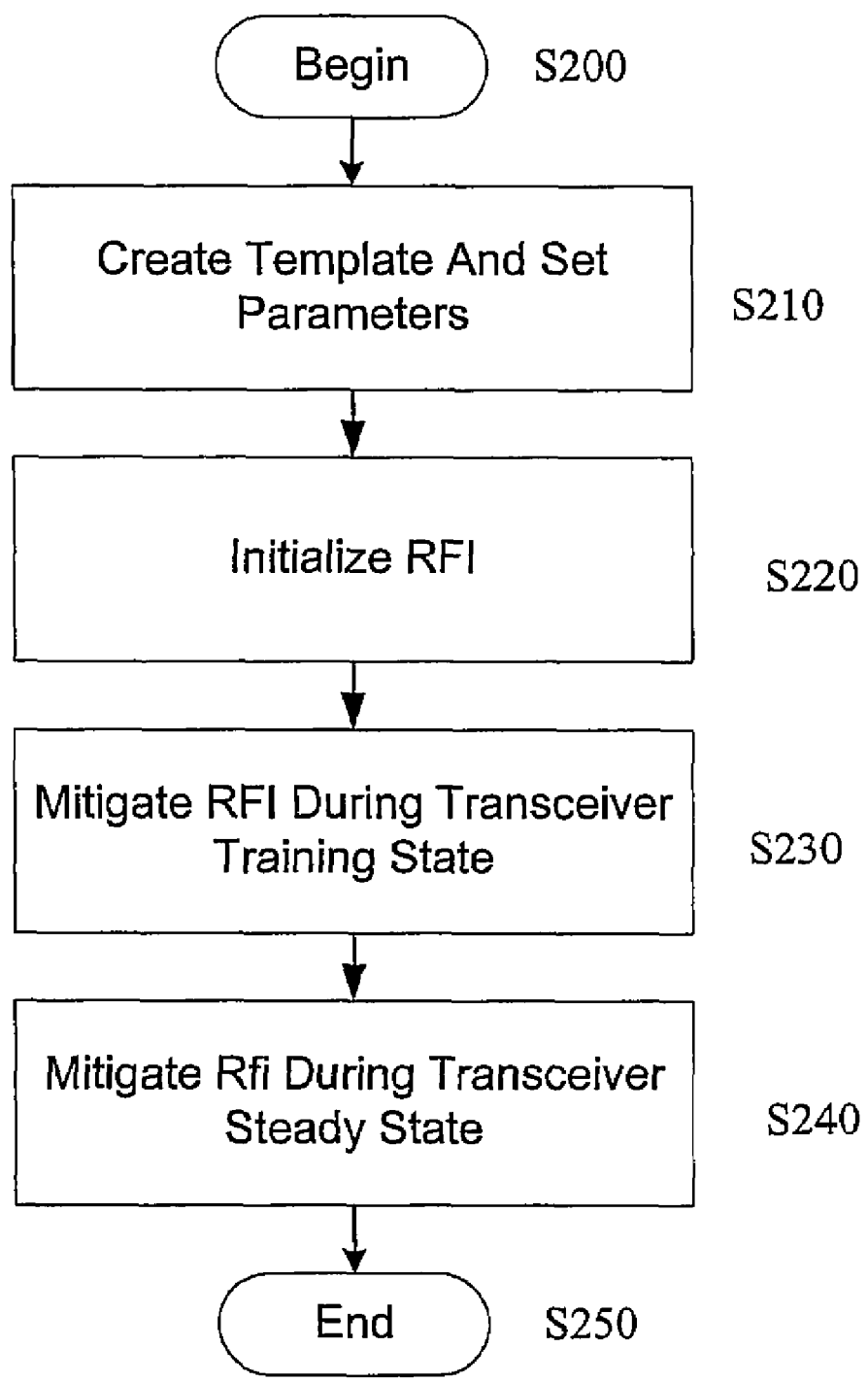
FIG. 2 is a flowchart illustrating the exemplary operation of the frequency-domain RFI mitigation device according to this invention.

FIG. 2 is a flowchart illustrating an exemplary method of operation of the frequency-domain RFI mitigation module 360 according to an embodiment of the invention. In particular, control begins in step S200 and continues to step S210. In step S210, an initialization step, a template is created. Next, in step S220, RFI initialization is performed. Then, in step S230, the RFI is mitigated during the transceiver training operations. Control then continues to step S240.

In step S240, RFI mitigation is performed during the transceiver steady state operation. Control then continues to step S250 where the control sequence ends.

The template creation step S210 can occur, for example, before the system is run for the first time. Thus, the templates must be created in advance and, for example, stored in a memory. Alternatively, the templates can also be created off-line and pre-stored in a memory.

Figure 3:
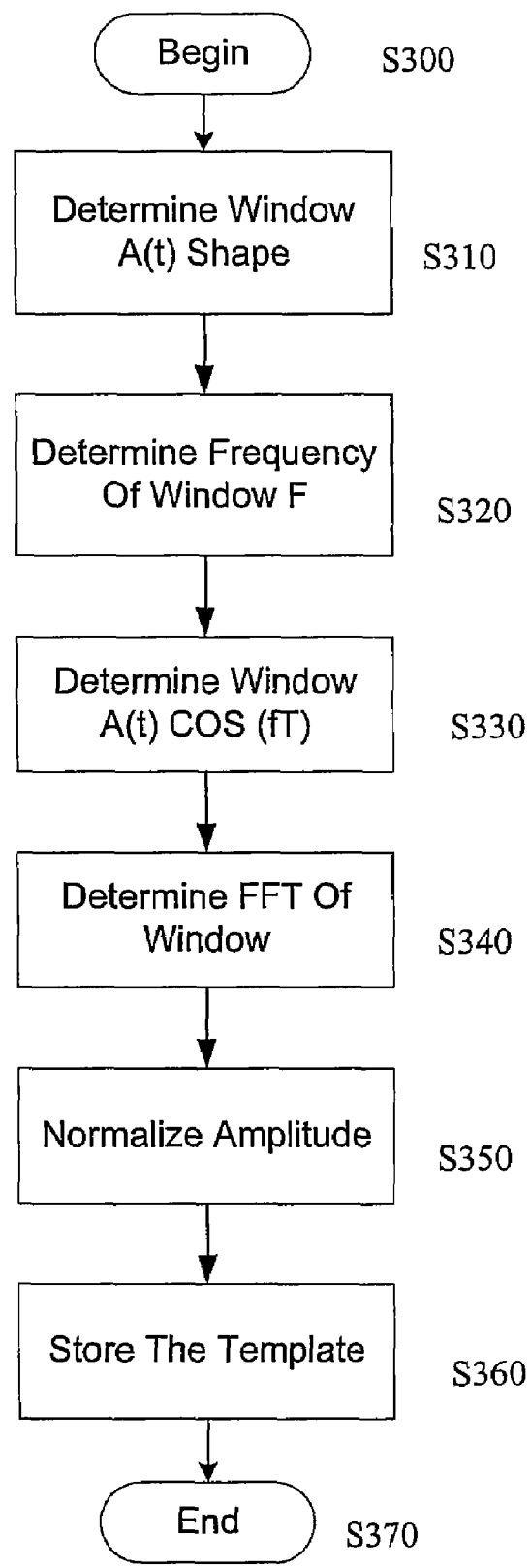
FIG. 3 is a flowchart illustrating an exemplary method of creating a template according to this invention.

FIG. 3 is a flowchart illustrating an exemplary method of the template creation process according to an embodiment of the invention. Specifically, control begins in step S300 and continues to step S310. In step S310, the shape of the time-domain window which will be used to construct the template is determined. Next, in step S320, the frequency used to construct the window is determined. Then, in step S330, a time-domain pass-band window is determined in accordance with A(t) COS (fT). Control then continues to step S340.

In step S340, the frequency-domain representation of the pass-band window is determined. Next, in step S350, the amplitude of the pass-band window is normalized resulting in the desired template. Then, in step S360, the template is stored. Control then continues to step S370 where the control sequence ends.

Figure 4:
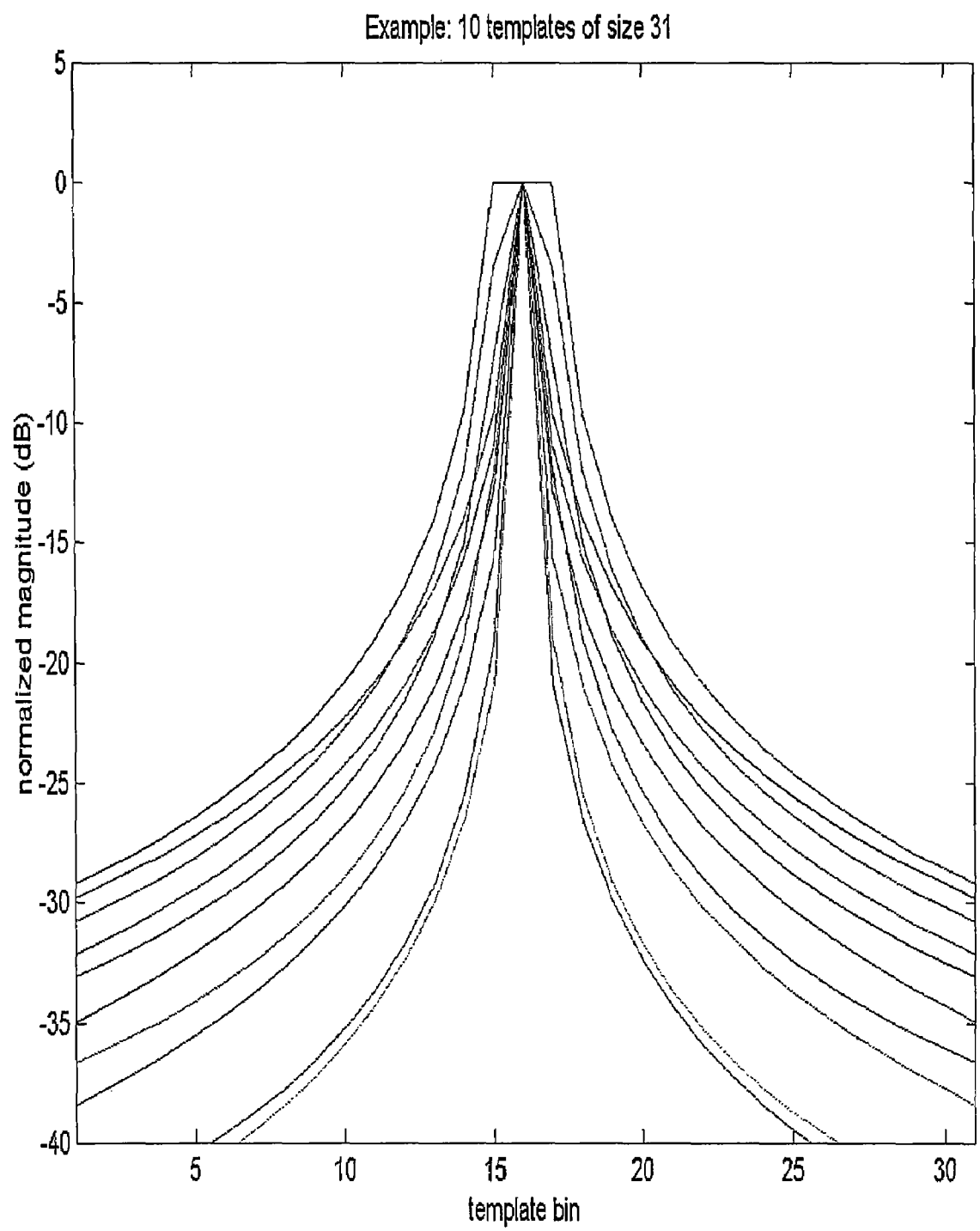
FIG. 4 shows an example of a set of templates according to this invention.

The stored templates can then be used to estimate the RFI during the mitigation process. In particular, FIG. 4 illustrates an exemplary set of 10 templates having a size of 31 created according to an embodiment of the invention. However, in general any number of templates can be stored based on, for example, the accuracy of the estimate desired for the RFI.

Figure 5:
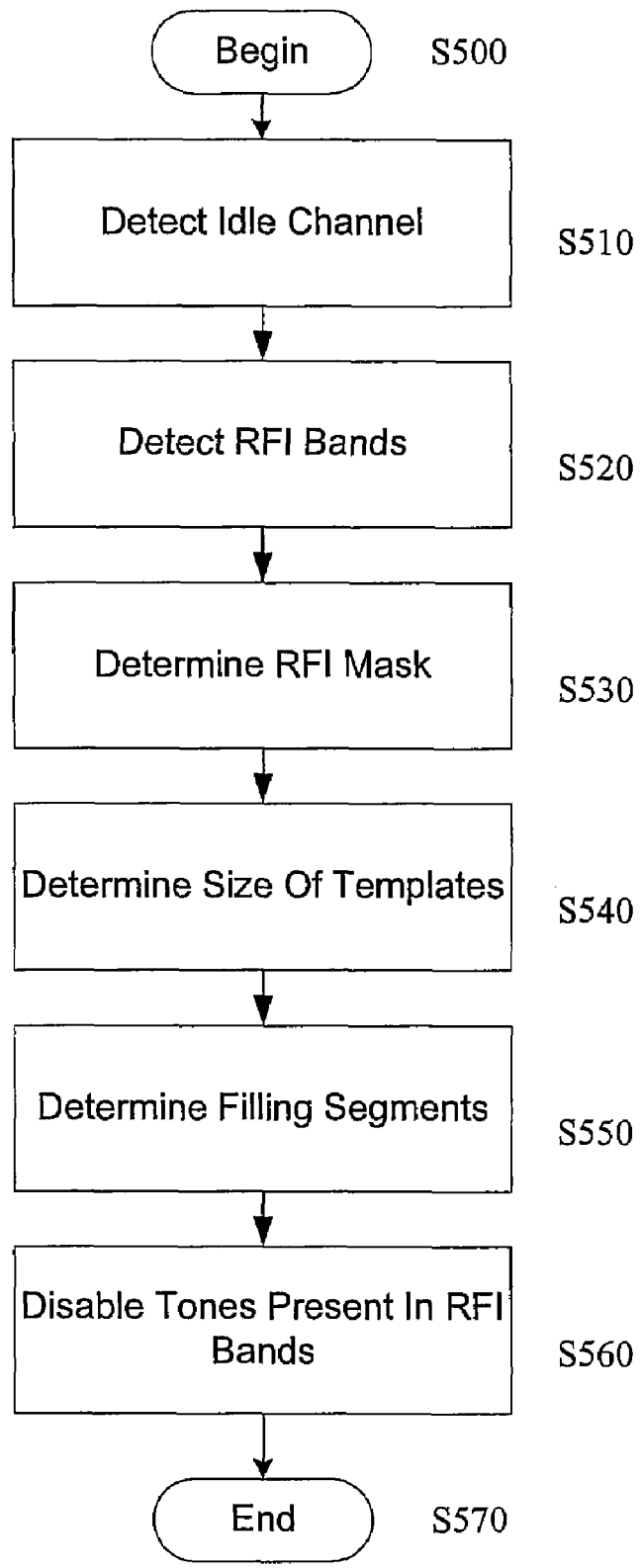
FIG. 5 is a flowchart illustrating an exemplary method of performing RFI initialization according to this invention.

FIG. 5 is a flowchart illustrating in greater detail the RFI initialization step S220 in greater detail. In particular, control begins in step S500 and continues to step S510. In step S510, the idle channel is detected. Specifically, the receiver measures the idle channel, which may contain noise, crosstalk and RFI signals in any portion of the spectrum, but not upstream or downstream multi-carrier signals. However, it is to be appreciated that the channel does not necessarily need to be idle. The channel could contain, for example, multi-carrier training signals as well as noises of different nature. Next, in step S520, the RFI bands are detected. Specifically, using the data obtained from step S510, the receiver establishes the presence of RFI bands and their locations. However, it is to be appreciated that in general the detection of the RFI bands can be accomplished using a variety of criteria, such as the peak-to-average ratio, or the like. Likewise, more accurate detection can be accomplished at the expense of more complex criteria. Control then continues to step S530.

In step S530, an RFI mask is determined. In particular, a mask is constructed in which all the values are one, except the three mask values centered on each RFI bin which are zeroed. However, in general, the number of values can be altered with the trade-off being the more values providing better template estimation at the expense of reducing the number of carriers. Next, in step S540, the size of templates is determined. Since the RFI bands can be located near the beginning of the FFT or close to the end of the FFT, the templates used for those RFI bands may need to be shortened to conform to the size of the FFT. Then, in step S550, the filling segments are determined. Based on the positions of the RFI bins and the lengths of the templates, the filling segments containing zeros are constructed. Then, the templates are translated to a particular RFI position with the aid of these segments. Control then continues to step S560.

In step S560, the tones located in RFI bands are disabled. Specifically, the receiver can instruct the transmitter to disable the tones located in the detected RFI bands. More specifically, the receiver can send the RFI mask to the tone manager. In an exemplary embodiment of the invention, the receiver can send a message instructing the transmitter to disable the tones in the signals during a certain phase of the training and/or the steady state. The message can contain a field that designates which tone number(s), e.g., tone number 77, 78 and 79, are to be disabled and during which phase(s), e.g., MEDLEY, REVERB1, etc., of training and/or steady state they are to be disabled. The tone manager would then receive this message and would disable the specified tones during the specified phases of training and or steady state, for example, during a signal-to-noise ratio measurement and related calculations, during the training of the equalizer, or during other types of training and/or measurements. During the unspecified phases of training and/or steady state, the transmitter would not disable the specified tones but would send the standard signals in those tones.

Figure 6:
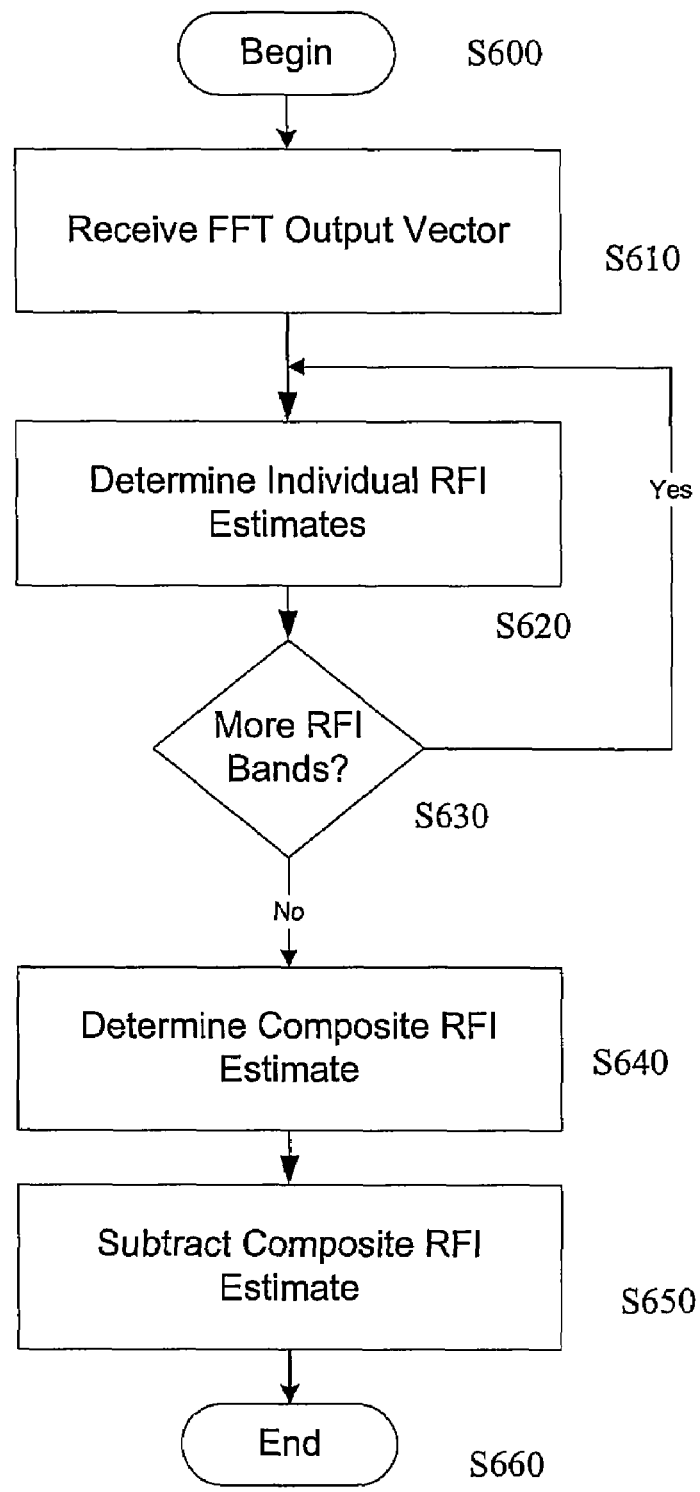
FIG. 6 is a flowchart illustrating a method of RFI mitigation during transceiver training according to this invention.

FIG. 6 is a flowchart illustrating RFI mitigation during the transceiver training procedure according to an exemplary embodiment of the invention. Specifically, FIG. 6 is outlines the steps of S230 in greater detail. Control begins in step S600 and continues to step S610. In step S610, an FFT output vector is determined. This FFT vector is the frequency-domain representation of a multi-carrier symbol containing a training signal. Next, in step S620, the individual RFI estimates are determined. However, in general, the individual RFI estimate can be determined using a variety of methods. In the present invention the RFI estimate is based on a distance measured between a received signal and a reference signal. The received signal is an individual RFI band in the FFT output vector and is one of the pre-stored templates scaled by the bin value at the center of the RFI band. The distance is measured between the three center bins of the individual RFI band and the three center bins of each template. The scaled template that results in minimum distance is then chosen. However, in general, other forms of reference signals are possible. For example, it is possible to determine the reference signals using a pre-defined analytical function. Additionally, it is possible to select the template using a pre-stored mapping function or some other selection mechanism. Furthermore, many distance definitions are possible with the trade off that some are better that others at the cost of complexity.

Next, in step S630, a determination is made whether more RFI bands are present in the FFT output vector. If more RFI bands are present, control jumps back to step S620. Otherwise control continues to step S640.

In step S640, a composite RFI estimate is determined. Then, using all of the individual RFI estimates, a composite sum is determined. The composite sum is an RFI estimate of the total RFI in the FFT output vector determined in step S610. Next, in step S650, the RFI mitigation operation is performed by subtracting the composite RFI estimate from the received FFT output signal, thus mitigating the RFI effects in the training signals. Control then continues to step S660 where the control sequence ends.

Figure 7:
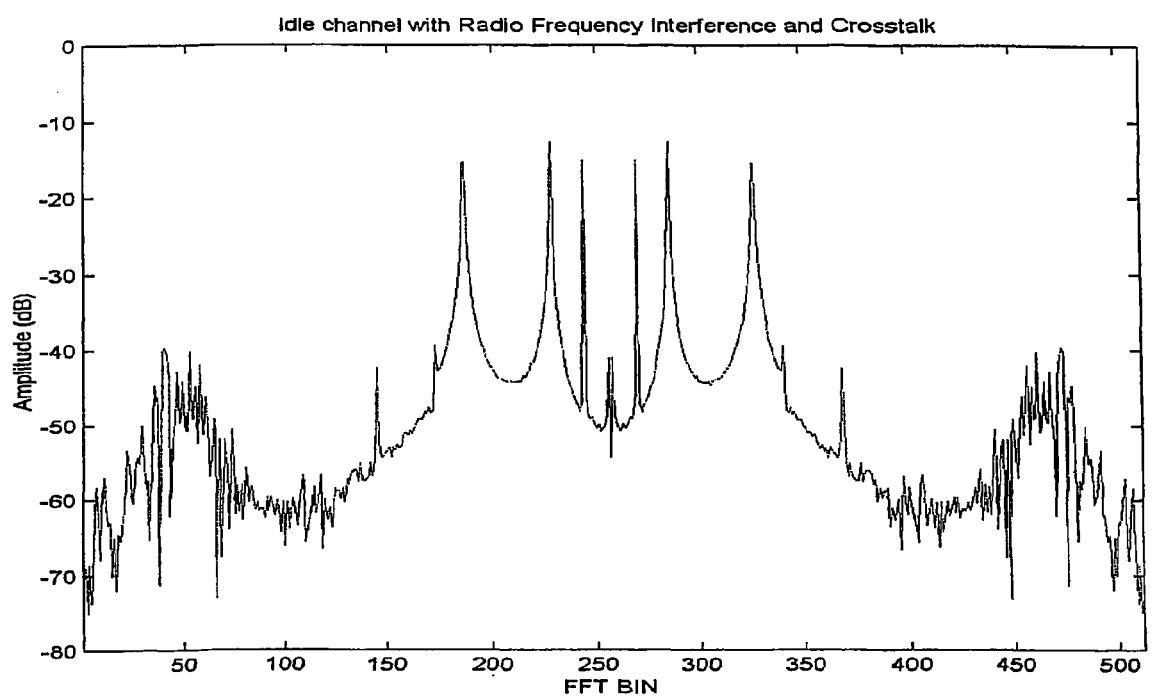
FIG. 7 illustrates an exemplary RFI detection/estimation for an idle channel with noise and a number of RFI bands according to this invention.
Figure 8:
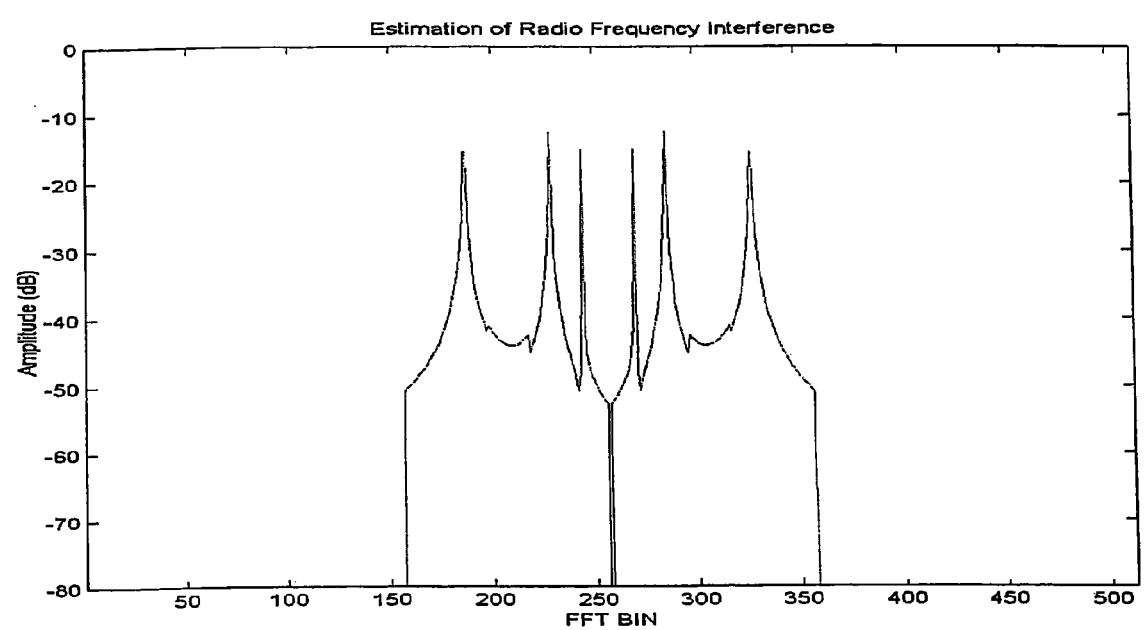
FIG. 8 illustrates an exemplary composite RFI estimate determined using an exemplary method according to this invention.

FIGS. 7 and 8 are examples of the RFI detection/estimation process. Specifically, FIG. 7 depicts the idle channel with noise and a number of RFI bands. In particular, the FFT of one frame of noise at the output of the frequency domain RFI mitigation. Using this frame of noise, the detection of RFI and the number of RFI bands can be established. In order to mitigate the RFI, the RFI is estimated. In particular, FIG. 8 illustrates the composite RFI estimate determined using the exemplary method of this invention. The RFI estimate is formed using the strongest individual RFI components, and it is subtracted from the original received signal to mitigate the RFI effects.

The method of FIG. 6 can also apply to the RFI mitigation during the transceiver steady state procedure according to an exemplary embodiment of the invention. Specifically, this corresponds to step S240 in greater detail. In particular, in step S610 a FFT output vector determined at the output of the time domain to frequency domain converter is received. This FFT vector is the frequency-domain representation of a multi-carrier symbol containing a steady state signal. Next, in step S620, the individual RFI estimates are determined. Then, in step S630a determination is made whether an RFI estimate for every RFI band in the FFT output vector has been determined. If more estimates are required, control jumps back to step S620. Otherwise, control continues to step S640.

In step S640, the composite RFI estimate is determined. All the individual RFI estimates are used to form a composite sum. The composite sum is an RFI estimate of the total RFI in the FFT output vector determined back in step S610. Next, in step S650, the RFI mitigation operation is performed by subtracting the composite RFI estimate from the received FFT output signal, thus mitigating the RFI effects in the steady state signals. Control then continues to step S660 where the control sequence ends.

It is to be appreciated that from the above description, that in this invention the RFI mitigation can operate not only during the steady state operation of the transceiver but also during the training state of the transceiver. This requires dynamically modifying the training signals when the presence of RFI is detected.

Figure 9:
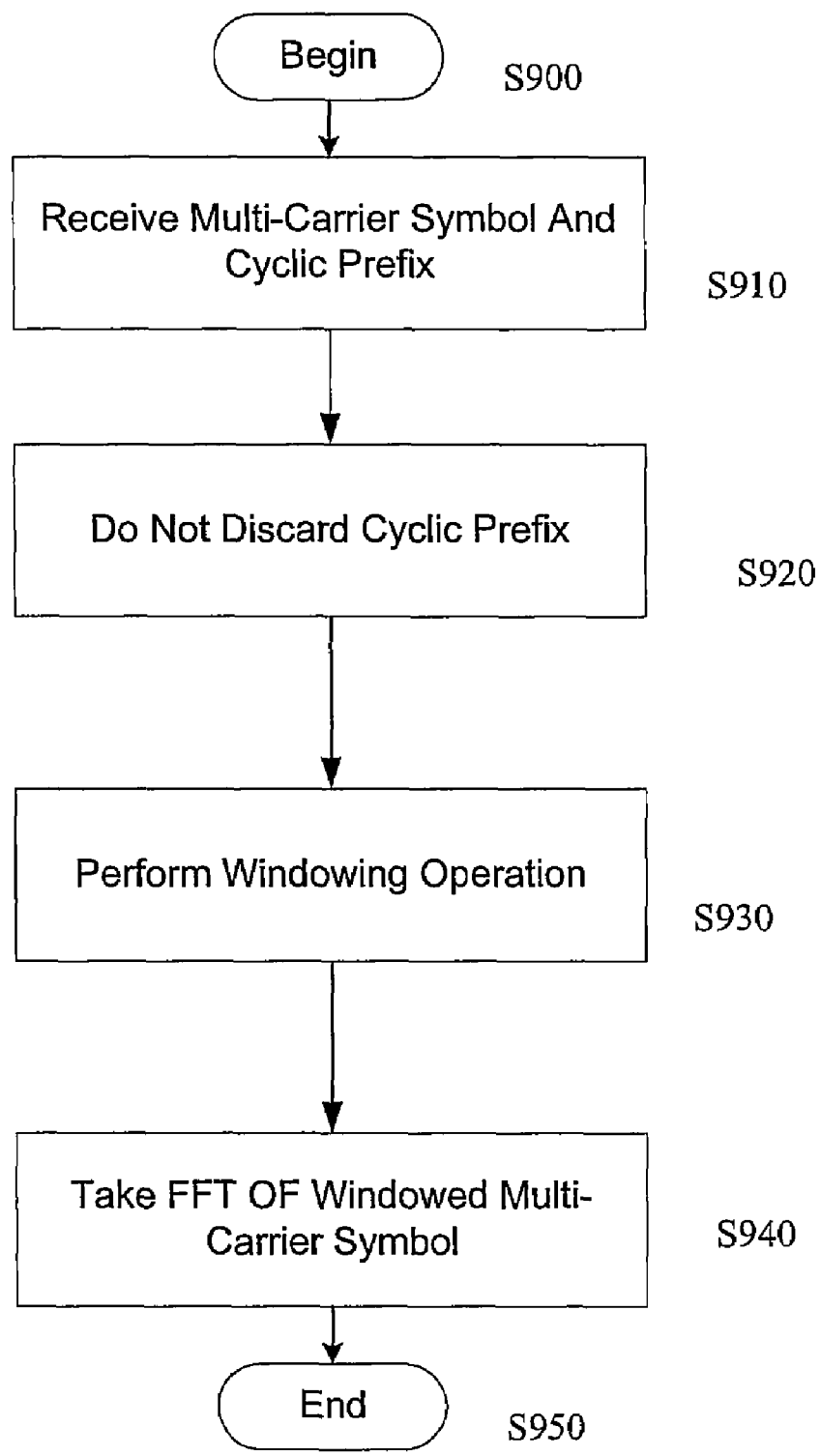
FIG. 9 is a flowchart illustrating an exemplary method of time-domain windowing according to this invention.

FIG. 9 is a flowchart illustrating an exemplary operation of the time-domain RFI mitigation module according to an embodiment of this invention. In particular, control begins in step S900 and continues to step S910. In step S910, a signal including both the multi-carrier symbol X[k] and the cyclic prefix CP[k] is received. Next, in step S920, CP[k] is retained for use in the windowing operation. Then, in step S930, the windowing is performed. Control then continues to step S940.

In step S940, the FFT of the windowed signal is determined. Control then continues to step S950 where the control sequence ends.

Figure 10:
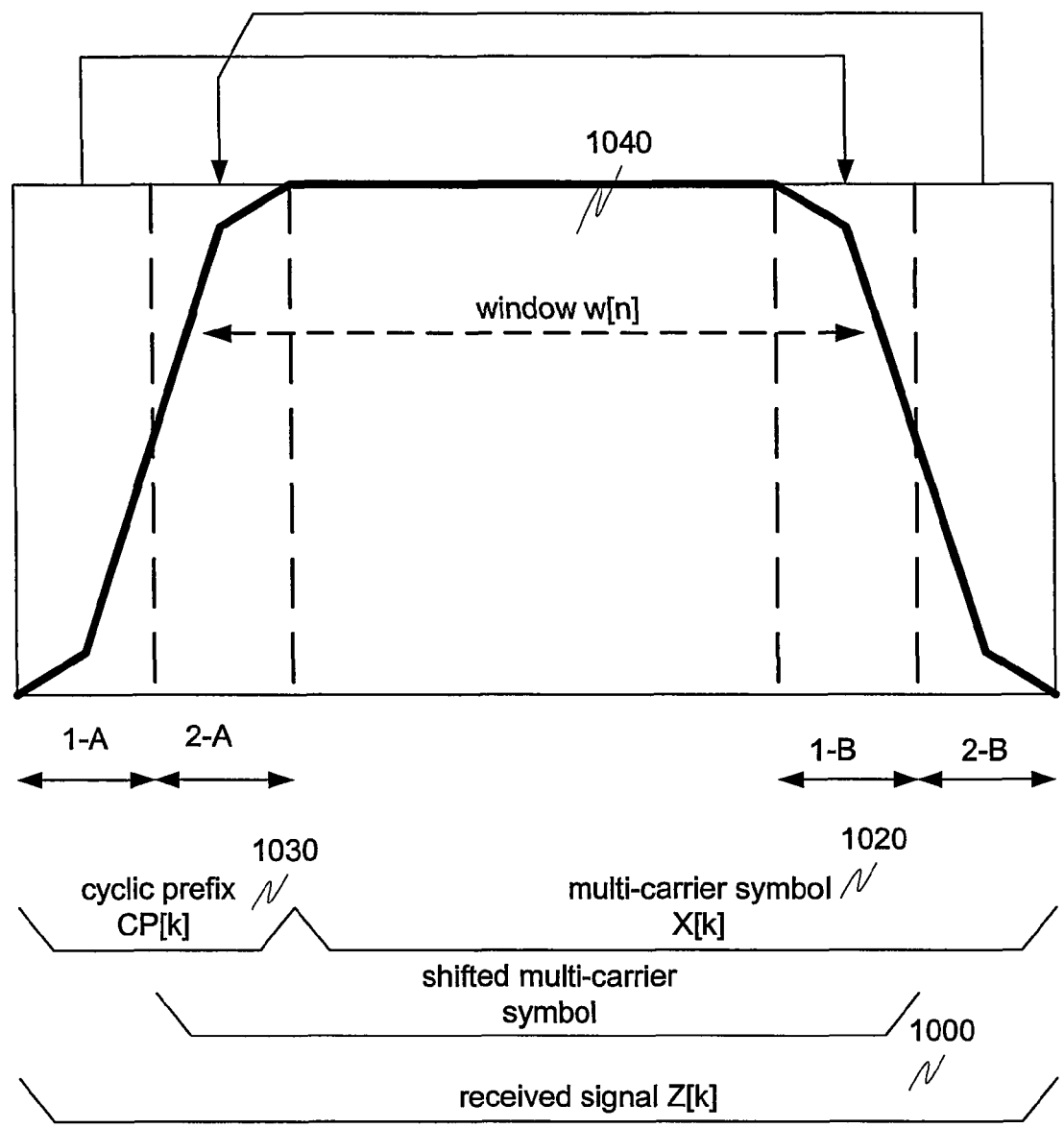
FIG. 10 illustrates an exemplary time-domain windowing operation according to this invention.

FIG. 10 illustrates an exemplary procedure used to realize the windowing operation of step S930. Specifically, the windowing operation is applied to the received signal Z[k] 1000, which consists of both the received multi-carrier symbol X[k] 1020 and the complete cyclic prefix CP[k] 1030. The operation can also be applied to X[k] and part of CP[k], by discarding the initial part of CP[k]. The example illustrated in FIG. 10 depicts an embodiment in which the window W[k] 1040 is applied using the complete CP[k]. For example, assume that X[k] has 512 values, that CP[k] has 32 values, that Z[k] has 512+32=544 values and that W[k] has also 544 values. The windowing operation consists of multiplying Z[k] by W[k], and then folding section 1-A into section 1-B, and folding section 2-B into section 2-A.

The result of the windowing operation is denoted U[k] having 512 values. The expression for U[k] in terms of W[k] and Z[k] is:

$$U[k] = \begin{cases} W[16+k]Z[16+k] + W[17-k]Z[528+k], & \text{for } k = 1, \ldots, 16, \\ Z[16+k], & \text{for } k = 17, \ldots, 496, \\ W[529-k]Z[16+k] + W[k-496]Y[k-496], & \text{for } k = 497, \ldots, 512, \end{cases}$$

since W[k]=W[545−k], k=1, 2, . . . , 32 by definition. Additionally, $$U[k] = \begin{cases} W[16+k]Z[16+k] + (1-W[16+k])Z[528+k], & \text{for } k = 1, \ldots, 16, \\ Z[16+k], & \text{for } k = 17, \ldots, 496, \\ (1-W[k])Z[512+k] + W[k]Z[k], & \text{for } k = 1, \ldots, 16, \end{cases}$$

since W[k]+W[33−k]=1, k=1, 2, . . . , 16 by definition. To save multiply operations:

$$U[k] = \begin{cases} W[16+k](Z[16+k] - Z(528+k]) + Z[528+k], & \text{for } k = 1, \ldots, 16, \\ Z[16+k], & \text{for } k = 17, \ldots, 496, \\ W[k](Z[k] - Z[512+k]) + Z[512+k], & \text{for } k = 1, \ldots, 16. \end{cases}$$

Notice that in the absence of noise, U[k]=X[((k−16))], i.e., U[k], is equal to a cyclically shifted version of X[k].

As illustrated in FIG. 1, the multicarrier information transceiver and related components can be implemented either on a DSL modem, such as an ADSL modem, or separate programmed general purpose computer having a communication device. However, the multicarrier information transceiver can also be implemented in a special purpose computer, a programmed microprocessor or a microcontroller and peripheral integrated circuit element, an ASIC or other integrated circuit, a digital signal processor, a hardwired or electronic logic circuit such as a discrete element circuit, a programmable logic device, such as a PLD, PLA, FPGA, PAL, or the like, and associated communications equipment. In general, any device capable of implementing a finite state machine that is in turn capable of implementing the flowcharts illustrated in FIGS. 2-3, 5-6 and 9 can be used to implement the multicarrier information transceiver according to this invention.

Furthermore, the disclosed method may be readily implemented in software using object or object-oriented software development environments that provide portable source code that can be used on a variety of computers, work stations, or modem hardware and/or software platforms. Alternatively, disclosed multicarrier information transceiver may be implemented partially or fully in hardware using standard logic circuits or a VLSI design. Other software or hardware can be used to implement the systems in accordance with this invention depending on the speed and/or efficiency requirements of this system, the particular function, and the particular software and/or hardware systems or microprocessor or microcomputer systems being utilized. The multicarrier information transceiver illustrated herein, however, can be readily implemented in a hardware and/or software using any known later developed systems or structures, devices and/or software by those of ordinary skill in the applicable art from the functional description provided herein and with a general basic knowledge of the computer and telecommunications arts.

Moreover, the disclosed methods can be readily implemented as software executed on a programmed general purpose computer, a special purpose computer, a microprocessor and associated communications equipment, a modem, such as a DSL modem, or the like. In these instances, the methods and systems of this invention can be implemented as a program embedded in a modem, such as a DSL modem, or the like. The multicarrier information transceiver can also be implemented by physically incorporating the system and method into a software and/or hardware system, such as a hardware and software system of a multicarrier information transceiver, such as an ADSL modem, VDSL modem, network interface card, or the like.

It is, therefore, apparent that there has been provided in accordance with the present invention, systems and methods for a multicarrier information transceiver. While this invention has been described in conjunction with a number of embodiments, it is evident that many alternatives, modifications and variations would be or are apparent to those of ordinary skill in the applicable art. Accordingly, applicants intend to embrace all such alternatives, modifications, equivalents and variations that are within the spirit and the scope of this invention.

What is claimed is:

1. A method, comprising:
    generating a message that specifies one or more tones to be disabled during at least a training state; and
    communicating the message over a communications link, the message to be received by a multi-carrier transceiver apparatus.

2. The method according to claim 1, wherein the message specifies one or more tones to be disabled during at least one phase of the training state.

3. The method according to claim 2, wherein the at least one phase is a signal-to-noise ratio measurement phase.

4. The method according to claim 2, wherein the at least one phase is an equalizer training phase.

5. The method according to claim 1, wherein the message specifies one or more tones to be disabled during at least one of a signal-to-noise ratio measurement phase or an equalizer training phase, the at least one of the signal-to-noise ratio measurement phase or the equalizer training phase to occur during at least the training state.

6. A method, comprising:

receiving, at multi-carrier transceiver apparatus, a message that specifies one or more tones to be disabled during at least a training state; and disabling the specified one or more tones during at least one of the training state or the steady state.

7. The method according to claim 6, wherein the message specifies one or more tones to be disabled during at least one phase of the training state.

8. The method according to claim 6, wherein the message specifies one or more tones to be disabled during at least one of a signal-to-noise ratio measurement phase or an equalizer training phase, the at least one of the signal-to-noise ratio measurement phase or the equalizer training phase to occur during at least the training state.

9. A multi-carrier transceiver apparatus, comprising:

at least one processor capable of executing software instructions that enable:

receiving a message that specifies one or more tones to be disabled during at least a training state; and disabling the specified one or more tones during at least the training state.

10. The apparatus according to claim 9, wherein the message specifies one or more tones to be disabled during at least one phase of the training state.

11. The apparatus according to claim 9, wherein the message specifies one or more tones to be disabled during at least one of a signal-to-noise ratio measurement phase or an equalizer training phase, the at least one of the signal-to-noise ratio measurement phase or the equalizer training phase to occur during at least the training state.

* * * * *